US008411588B2

(12) United States Patent
Wu et al.

(10) Patent No.: US 8,411,588 B2
(45) Date of Patent: Apr. 2, 2013

(54) METHODS AND APPARATUS TO MANAGE WIRELESS DEVICE POWER CONSUMPTION

(75) Inventors: Yan Wu, Waterloo (CA); Ahmad Mohammad Kholaif, Waterloo (CA); Scott P. Gammon, Waterloo (CA); Rudy Rawlins, Toronto (CA); Michael Montemurro, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 720 days.

(21) Appl. No.: 12/615,103

(22) Filed: Nov. 9, 2009

(65) Prior Publication Data

US 2011/0110282 A1  May 12, 2011

(51) Int. Cl.
*H04L 12/28* (2006.01)
*G08C 17/00* (2006.01)
*H04W 4/00* (2009.01)
*H04B 1/38* (2006.01)
*H04B 7/00* (2006.01)

(52) U.S. Cl. ........ 370/254; 370/311; 370/329; 370/338; 455/73; 455/515; 455/528

(58) Field of Classification Search .................. 370/319, 370/338; 455/127.4, 574
See application file for complete search history.

(56) References Cited

U.S. PATENT DOCUMENTS

| | | | |
|---|---|---|---|
| 2005/0122926 A1* | 6/2005 | Cromer et al. ................. | 370/311 |
| 2005/0136833 A1 | 6/2005 | Emeott et al. | |
| 2006/0068832 A1 | 3/2006 | Islam et al. | |
| 2007/0008922 A1* | 1/2007 | Abhishek et al. ............. | 370/329 |
| 2007/0082688 A1 | 4/2007 | Tu et al. | |
| 2007/0086399 A1 | 4/2007 | Akiyama | |
| 2007/0140108 A1* | 6/2007 | Skinner ......................... | 370/216 |
| 2007/0184852 A1* | 8/2007 | Johnson et al. ............. | 455/456.1 |
| 2007/0249291 A1* | 10/2007 | Nanda et al. .................. | 455/73 |
| 2008/0232270 A1* | 9/2008 | Fleming et al. ................ | 370/254 |

FOREIGN PATENT DOCUMENTS

| | | |
|---|---|---|
| EP | 1684465 A1 | 7/2006 |
| EP | 1962454 A1 | 8/2008 |
| EP | 2073445 A1 | 6/2009 |
| JP | 2000069552 A | 3/2000 |
| WO | 01/01666 A1 | 1/2001 |
| WO | 03/030575 A1 | 4/2003 |
| WO | 2004/042941 A1 | 5/2004 |

OTHER PUBLICATIONS

The European Patent Office, "Extended European Search Report," European application No. EP 09178962.8, Aug. 25, 2010, 13 pages.
Patent Cooperation Treaty, "International Search Report," issued by the International Searching Authority in connection with PCT application No. PCT/IB2010/002644, mailed Feb. 2, 2011 (4 pages).
Patent Cooperation Treaty, "Written Opinion of the International Searching Authority," issued by the International Searching Authority in connection with PCT application No. PCT/IB2010/002644, mailed Feb. 2, 2011 (4 pages).

* cited by examiner

*Primary Examiner* — Brandon Renner
(74) *Attorney, Agent, or Firm* — Hanley, Flight and Zimmerman, LLC

(57) ABSTRACT

Example methods and apparatus to manage wireless device power consumption are disclosed. In accordance with a disclosed example method a data frame exchange is initiated with an access point of a wireless network. In response to not successfully completing the frame exchange with the access point, the access point is designated as providing the wireless terminal with fringe wireless signal coverage.

20 Claims, 7 Drawing Sheets

METHODS AND APPARATUS TO MANAGE WIRELESS DEVICE POWER CONSUMPTION

FIELD OF THE DISCLOSURE

The present disclosure relates generally to network communications and, more particularly, to methods and apparatus to manage wireless device power consumption.

BACKGROUND

Wireless network deployments, such as wireless local area networks (WLANs), allow wireless terminals to access other devices and services. Wireless terminals are often mobile devices that may be moved between different locations, some of which are associated with different wireless networks. When a wireless terminal is moved away from a coverage area of a first wireless network, the wireless terminal becomes disassociated from the first wireless network, and when moved to a new location having wireless network coverage, the wireless terminal can associate itself with the wireless network of that new location.

Mobile wireless terminals are often configured to conserve battery power (or battery charge) by implementing certain power saving processes including entering into one or more different power saving modes. In known power-saving techniques, when a wireless terminal is associated with a wireless network, the wireless terminal works in cooperation with the wireless network to enable the wireless terminal to enter into a power saving mode, while ensuring that the wireless terminal will not miss information sent to it by the wireless network.

DETAILED DESCRIPTION

Figure 1:
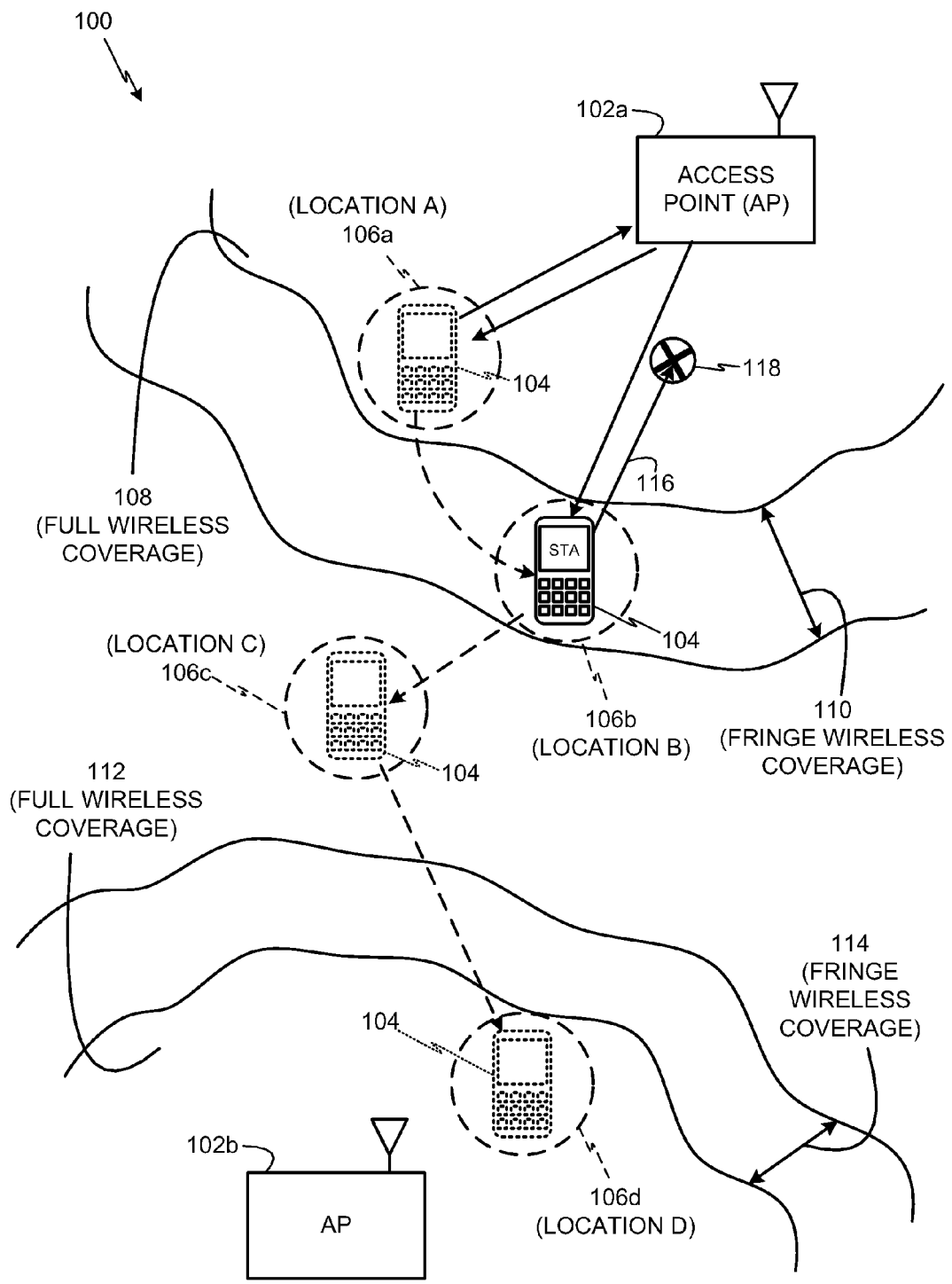
FIG. 1 depicts an example wireless terminal moving between full wireless coverage and fringe wireless coverage areas provided by wireless access points.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Additionally, though described in connection with example implementations using wireless local area networks, access points and other network structures and devices, the example methods and apparatus described herein are not limited to implementations using such entities. Accordingly, while the following describes example methods and apparatus, persons having ordinary skill in the art will readily appreciate that the examples provided are not the only way to implement such methods and apparatus.

The example methods and apparatus described herein can be used by wireless terminals to manage power consumption when moved between areas of different wireless signal coverage. That is, even when a wireless terminal is moved between areas having different wireless signal coverage, the example methods and apparatus described herein enable the wireless terminal to transition into and out of a power save mode (e.g., a power conservation mode in which less power is consumed by the wireless terminal relative to when the wireless terminal is operating in a normal operating mode). Examples of different types or amounts of wireless signal coverage include full wireless signal coverage and fringe wireless signal coverage. In the illustrated examples described herein, an area having full wireless coverage is one in which a wireless local area network (WLAN) access point (AP) and a wireless terminal can fully exchange data frames. That is, when a wireless terminal is in a full wireless coverage area provided by a WLAN AP, the wireless terminal can receive signals transmitted by the WLAN AP, and the WLAN AP can, in turn, receive signals transmitted by the wireless terminal. In the illustrated examples described herein, an area having fringe wireless signal coverage is one in which the wireless terminal can receive signals transmitted by the WLAN AP, but the WLAN AP cannot receive signals transmitted by the wireless terminal.

Asymmetric signal coverage characteristics of areas having fringe wireless signal coverage are due to the differences between antenna and radio characteristics and resulting wireless transmission propagations of signals sent by the WLAN AP and the wireless terminal. Typically, WLAN AP transmissions can propagate a relatively longer distance than a mobile wireless terminal. Therefore, the relatively stronger wireless signals transmitted by the WLAN AP can propagate into an area of fringe wireless signal coverage such that they can be received by the wireless terminal when it is in the area of fringe wireless signal coverage. However, the relatively weaker wireless signals transmitted by the wireless terminal when it is in the area of fringe wireless signal coverage are attenuated sufficiently below an acceptable reception strength by the time the signals reach the WLAN AP (if they reach the WLAN AP at all). Thus, the wireless transmission signals from the wireless terminal cannot be received by the WLAN AP under such circumstances. Thus, in the area of fringe wireless signal coverage, the communication links between the WLAN AP and the wireless terminal are asymmetrical, because the wireless terminal can receive signals from the WLAN AP, but the WLAN AP cannot receive signals from the wireless terminal.

Known techniques to enable a wireless terminal to enter into a power save mode when attached to, or in connection with, a WLAN AP require a successful frame exchange sequence where the wireless terminal signals a power save communication to the WLAN AP and awaits receipt of an acknowledgement (ACK) communication from the WLAN AP. For example, the IEEE® 802.11 standards published by the Institute of Electrical and Electronics Engineers (IEEE) require that a wireless terminal wanting to go to doze mode (e.g., a power save mode) to achieve power savings must first successfully complete a frame exchange with an associated WLAN AP. Thus, power save signaling results from a successful frame exchange with the associated WLAN AP. The frame exchange involves the wireless terminal sending an uplink (UL) frame (e.g., a data frame, a NULL data frame, a quality of service (QoS) data frame, or a QoS NULL data frame) with a Power Save (PS) bit set to one (1). However, before the wireless terminal can enter the desired power save mode, the wireless terminal must await receipt of an ACK communication sent by the WLAN AP in response to the wireless terminal's data frame exchange signaling a power-save change. In such implementations, the ACK communication acknowledges that the WLAN AP is aware of the new power save state of the wireless terminal and functions as a confirmation that the WLAN AP will buffer all frames that might be destined to the wireless terminal via the WLAN AP while the wireless terminal is sleeping (i.e., in the power save mode).

Using known techniques to transition a wireless terminal into a power save mode while the wireless terminal is in an area of fringe wireless coverage typically results in the wireless terminal never receiving the ACK communication from the WLAN AP because the WLAN AP never received the data frame transmitted by the wireless terminal. This is a result of the asymmetry in the wireless link-budget between the wireless terminal and the WLAN AP discussed above such that the wireless terminal can receive communications from the WLAN AP because of the WLAN AP's stronger transmissions, but, in the fringe wireless coverage area, the WLAN AP may not be able to receive UL transmissions from the wireless terminal. After some time elapses and the wireless terminal has not received an ACK communication, the wireless terminal triggers an IEEE® 802.11 power save retry mechanism. During the power save retry, the wireless terminal remains in an awake mode consuming relatively higher power (e.g., consuming relatively high quantities of power) for some time interval (e.g., different implementations use different values such as 10's of milliseconds or more). If the failure in power save state-change signaling continues (e.g., the wireless terminal is kept stationary), the wireless terminal remains in an active mode for extended durations since the WLAN AP is unable to successfully receive the wireless terminal's UL communications and respond with an ACK communication. Such a situation results in continuous draining of the wireless terminal's battery while the wireless terminal is in the fringe wireless coverage area.

The continuous battery drain problem can have a higher impact on battery charge life at wireless access hotspots where there are no other neighboring candidate WLAN APs to which the wireless terminal can transition. In addition, such continuous battery drain can also occur in areas having enterprise setups where a current associated WLAN AP is the one for which a wireless terminal receives the highest received signal strength indication (RSSI) values among all other WLAN APs belonging to the same service set identifier (SSID).

Unlike known techniques, the example methods and apparatus described herein enable wireless terminals to transition into power save modes even when those wireless terminals are in an area of fringe wireless coverage where using a successful frame exchange with WLAN APs is not possible. At least some advantages of the example methods and apparatus are that a wireless terminal can operate in areas having different levels of wireless coverage without unnecessarily allowing excessive battery drainage by its wireless portion. In addition, a wireless terminal need not expend additional battery charge to continuously retry the exchange of power save communications with a WLAN AP prior to entering a power save mode. Those of ordinary skill in the art will appreciate further advantages of the example methods and apparatus from the example implementations described herein.

The example methods and apparatus described herein can be used in connection with mobile communication devices, mobile computing devices, or any other element, entity, device, or service capable of communicating wirelessly with a wireless network. Devices, also referred to as terminals, wireless terminals, stations (non-AP stations), or user equipment (UE), may include mobile smart phones (e.g., a BlackBerry® smart phone), wireless personal digital assistants (PDA), laptop/notebook/netbook computers with wireless adapters, etc. The example methods and apparatus are described herein in connection with the WLAN communication standard known as IEEE® 802.11. However, the example methods and apparatus may additionally or alternatively be implemented in connection with other wireless communication standards including other WLAN standards, personal area network (PAN) standards, wide area network (WAN) standards, or cellular communication standards.

The example methods and apparatus described herein can be implemented in any environment providing wireless access for network connectivity (e.g., WLANs). For instance, the example methods and apparatus can be implemented in private WLAN access locations or environments or in public WLAN access locations or environments in which it is expected that one or more users carrying respective wireless terminals will frequently connect and disconnect from a WLAN as they enter and exit the WLAN access locations or environments.

Turning to FIG. 1, an example WLAN environment 100 is shown as having WLAN APs 102a and 102b, which may be connected to the same network (not shown) (e.g., a private network, a public network, the Internet, etc.) or different networks (not shown). Also shown is a wireless terminal 104 that can be moved between different locations to connect with either of the APs 102a-b. In the illustrated example, the wireless terminal 104 is shown as moved between location A 106a, location B 106b, location C 106c, and location D 106d. In the illustrated example, the APs 102a-b are associated with different wireless coverage areas. The AP 102a is associated with a full wireless coverage area 108 and a fringe wireless coverage area 110, and the AP 102b is associated with a full wireless coverage area 112 and a fringe wireless coverage area 114. Each of the example locations 106a-d resides in a different wireless signal coverage area. In particular, location A 106a is in the full wireless coverage area 108 of the AP 102a, location B 106b is in the fringe wireless coverage area 110 of the AP 102a, location C 106c is in a dead zone or an area having no wireless signal coverage, and location D 106d is in a full wireless coverage area 112 of the AP 102b.

In the illustrated example of FIG. 1, when the wireless terminal 104 is in the full wireless coverage area 108 of the AP 102a, the AP 102a can receive transmissions from the wireless terminal 104 and the wireless terminal 104 can receive wireless transmissions from the AP 102a. When the wireless terminal 104 is moved to the fringe wireless coverage area 110 (e.g., a user carrying the wireless terminal 104 moves to the fringe wireless coverage area 110), the wireless terminal 104 can successfully receive transmissions from the AP 102a, but the AP 102a cannot successfully receive transmissions from the wireless terminal 104. In the illustrated example of FIG. 1, signals transmitted by the wireless terminal 104 while at location B 106b are generally indicated by arrow 116. The termination of arrow 116 at a substantial attenuation zone 118 is representative of the transmissions from the wireless terminal 104 being sufficiently attenuated such that the AP 102a cannot effectively receive transmissions from the wireless terminal 104 when the wireless terminal 104 is in the fringe wireless coverage area 110 of the AP 102a.

When the wireless terminal 104 is at location A 106a and initiates a power save procedure by initiating a data frame exchange (e.g., communicating a frame having a power save bit set to one ('1')) with the AP 102a, the AP 102a is able to receive a data frame transmitted by the wireless terminal 104 and communicate an ACK frame to the wireless terminal 104. In this manner, the wireless terminal 104 can transition into a power save mode upon receipt of the ACK frame from the AP 102a. However, when the wireless terminal 104 is moved to location B 106b and initiates a power save procedure, the AP 102a will never receive the data frame communicated by the wireless terminal 104. As a result of this, the AP 102a will not communicate an ACK frame to the wireless terminal 104. Using the example methods and apparatus described herein, the wireless terminal 104 will transition into a power save mode even when the ACK frame is not received from the AP 102a.

In the illustrated examples described herein, the wireless terminal 104 can initiate a frame exchange using any communication frame, of which NULL data is a valid type. Examples of such frames include data frames, NULL data frames, QoS data frames, QoS NULL data frames, and control frames such as request-to-send (RTS) or clear-to-send (CTS). In some instances, the data frame transmitted by the wireless terminal 104 in the frame exchange can be used to signal a power save transition (e.g., by setting a power save bit to one (1)), while in other instances the frame exchange need not signal the power save transition. Thus, although some example implementations are described herein in connection with frame exchanges that signal a power save transition, frame exchanges that do not signal such power save transition can also be used. For example, an initiated frame exchange can involve the wireless terminal 104 transmitting an RTS frame to the AP 102a, initiating a frame exchange without signaling a power save transition. In such an instance, a corresponding ACK frame expected by the wireless terminal 104 from the AP 102a would be a CTS frame in response to the RTS frame. Additionally or alternatively, the wireless terminal 104 can initiate a frame exchange by transmitting a CTS frame (as a CTS-to-self frame) in which the destination address of the frame is set to the address of the wireless terminal 104. The wireless terminal 104 can then follow the CTS frame with a data frame transmission signaling a power save transition. In such instances, the wireless terminal 104 would expect an ACK frame from the AP 102a acknowledging receipt of the data frame by the AP 102a.

Figure 2:
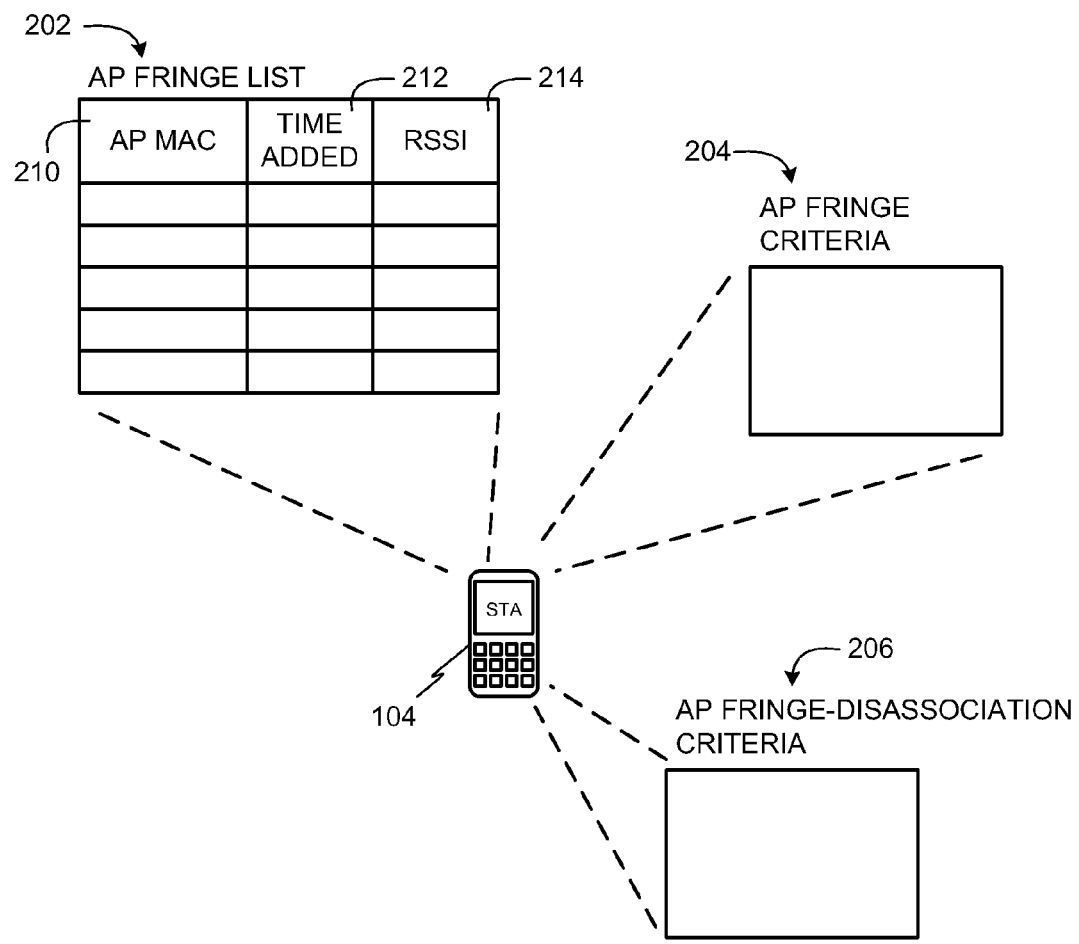
FIG. 2 depicts data structures stored in the wireless terminal of FIG. 1 to manage power consumption in connection with moving the wireless terminal between areas of different wireless coverage.

To enter a power save mode without having received an ACK frame from the AP 102a, the wireless terminal 104 is configured to analyze a non-responsiveness characteristic associated with the AP 102a. For example, a non-responsiveness characteristic may be generated by the wireless terminal 104 by maintaining a count of the quantity of data or NULL data frames not acknowledged by the AP 102a (i.e., failed frame exchanges). When the quantity of consecutive failed frame exchanges signaling a power-save change amounts to meeting or exceeding a threshold value (e.g., the threshold value could be an absolute quantity of failed data frames with a power-save change indication or a failure rate (i.e., a quantity, within a particular duration, of failed data frame exchanges signaling a power-save change)), the wireless terminal 104 disconnects from the AP 102a and associates the AP 102a with an AP fringe list. An example AP fringe list 202 is shown in FIG. 2. Although the above describes using a quantity of consecutive failed frame exchanges signaling a power-save change, in some example implementations, any type of initiated frame exchange could be used including frame exchanges that do not signal a power save change (e.g., frame exchanges used to communicate any data other than a wireless terminal's intention to change its power save status).

While the AP 102a is in the AP fringe list 202, the wireless terminal 104 can attempt to associate with it at a relatively lower associate-attempt rate (e.g., at a predetermined interval $T_L$) compared to a relatively higher associate-attempt rate ($T_H$) used for an AP not appearing on the AP fringe list 202. The lower associate-attempt rate ($T_L$) enables the wireless terminal 104 to recover from temporary poor connection quality situations, while at the same time allowing the wireless terminal 104 to attempt associating with (e.g., transitioning/roaming to) other APs (e.g., the AP 102b) of the same SSID at the higher rate ($T_H$) provided that those APs are not in the AP fringe list 202. For instance, when the wireless terminal 104 is moved to location C 106c, the wireless terminal 104 will not be able to associate itself with any AP because the location C 106c is in a dead zone, and the AP 102a will remain in the AP fringe list 202 of the wireless terminal 104 for at least some duration. However, when the wireless terminal 104 is moved to location D 106d, the wireless terminal 104 will associate itself with the AP 102b. In some example implementations, the wireless terminal 104 can remove APs from its AP fringe list 202 when the wireless terminal 104 re-associates itself with one of the APs in the AP fringe list 202 or with another AP. The example methods and apparatus described herein can be implemented in connection with different rules or criteria that can be used to add APs to the AP fringe list 202 and different rules or criteria to remove APs from the AP fringe list 202.

When attempting to roam to another AP, the wireless terminal 104 will perform scans to find different APs having acceptable signal strengths. In some example implementations, an AP from which the wireless terminal 104 receives fringe wireless coverage (i.e., an AP indicated in the AP fringe list 202) should not be considered for inter-AP transition/roaming unless it is the only AP-transition/roaming candidate available. For instance, in the illustrated example of FIG. 1, if the wireless terminal 104 associates the AP 102a with the AP fringe list 202, the wireless terminal 104 can perform an RSSI scan at the relatively higher associate-attempt rate ($T_H$) to determine whether it can transition/roam to the AP 102b, but the wireless terminal 104 cannot consider the AP 102a as a transition/roam-to candidate so long as the AP 102a is associated with the AP fringe list 202. However, the wireless terminal 104 can attempt to associate itself with the AP 102a while it is indicated as providing only fringe wireless coverage (i.e., a fringe-indicated AP) so long as such attempts are performed at the lower associate-attempt rate ($T_L$).

Designating APs as fringe-indicated APs is done relative to wireless terminals. For instance, the wireless terminal 104 may designate the AP 102a as a fringe-indicated AP when the wireless terminal 104 is at location B 106b within the fringe wireless coverage area 110 (FIG. 1), while another wireless terminal (not shown) located within the full wireless coverage area 108 (FIG. 1) would not designate the AP 102a as a fringe-indicated AP due to that wireless terminal being provided with full wireless signal coverage by the AP 102a. Because APs appearing on the AP fringe list 202 of the wireless terminal 104 are known to be associated with suspect communication qualities (e.g., due to the wireless terminal 104 being or having been in a fringe wireless signal coverage area of those APs), attempts to re-associate with those APs are performed at the lower associate-attempt rate ($T_L$) due to the lower likelihood that transmission signals from those APs will have sufficiently acceptable RSSI signal strength values (relative to the location of the wireless terminal 104) to warrant a high rate of re-association attempts. In this manner, wireless terminal battery power can be preserved by using the lower associate-attempt rate ($T_L$) to poll APs with known low-strength (or low-quality) wireless links.

Turning to FIG. 2, the wireless terminal 104 of FIG. 1 is shown by way of example as storing data structures to implement power consumption management techniques as described herein. As shown, the wireless terminal 104 stores the AP fringe list 202, an AP fringe criteria data structure 204, and an AP fringe-disassociation criteria data structure 206. The AP fringe list 202, the AP fringe criteria data structure 204, and the AP fringe-disassociation criteria data structure 206 can be stored in a memory (e.g., the flash memory 316 and/or the RAM 318 of FIG. 3) of the wireless terminal 104 in memory space allocated to a driver layer by drivers (e.g., device drivers) or low-level firmware and/or in memory space allocated to an application layer and accessible by operating system (OS)-based applications. In this manner, the example processes described herein can be implemented using firmware executed at a driver layer or can be implemented using software executable on an OS at an application layer.

As discussed above in connection with FIG. 1, the AP fringe list 202 can be used to store identifiers of fringe-indicated APs (e.g., APs from which wireless terminals receive fringe coverage while in particular locations relative to those APs). The AP fringe criteria data structure 204 can be used to store one or more rules or criteria that can be used to determine when APs should be designated as fringe-indicated APs. The AP fringe-disassociation criteria data structure 206 can be used to store one or more rules or criteria that can be used to determine when APs should be removed from the AP fringe list 202.

As shown in FIG. 2, the AP fringe list 202 includes an AP media access control (MAC) column 210 and a time added column 212. The AP MAC column 210 can be used to store MAC addresses of fringe-indicated APs, and the time added column 212 can be used to store timestamp information in association with each MAC address to indicate the time at which each fringe-indicated AP was stored in the AP fringe list 202. Storing MAC addresses of fringe-indicated APs in the AP MAC column 210 facilitates the wireless terminal 104 to track which APs are to be scanned at the relatively lower associate-attempt rate ($T_L$) described above. In addition, the wireless terminal 104 can refer to the stored AP MAC addresses upon receiving beacon signals from APs to determine whether those APs have been designated as fringe-indicated APs for purposes of attempting re-associations independent of the scans at the lower associate-attempt rate ($T_L$). More specifically, when the wireless terminal 104 wakes momentarily from a power save mode to check for AP beacon signals, the wireless terminal 104 can extract the AP MAC addresses corresponding to any received beacon signals and determine whether any of the AP MAC addresses corresponds to a fringe-indicated AP. In this manner, when the wireless terminal 104 is operating in an area of fringe wireless signal coverage (e.g., the fringe wireless coverage area 110) associated with a fringe-indicated AP (e.g., the AP 102a), the wireless terminal 104 can ignore all beacon signals received from that fringe-indicated AP. As discussed above in connection with FIG. 1, when the wireless terminal 104 is located in the fringe wireless coverage area 110, it can receive transmission signals from the AP 102a but the AP 102a cannot receive transmission signals from the wireless terminal 104. Therefore, any attempt by the wireless terminal 104 to reconnect with the AP 102a would be unproductive and, thus, ignoring beacon signals from the AP 102a based on its MAC address being stored in the AP fringe list 202 enables the wireless terminal 104 to operate more efficiently by not attempting unproductive and futile re-associations with the AP 102a at high re-associate attempt rates.

In the illustrated example of FIG. 2, the AP fringe list 202 also includes an RSSI column 214 to store RSSI values indicative of link qualities of APs added to the AP fringe list 202. For example, when the wireless terminal 104 adds a MAC address of an AP in the AP fringe list 202, the wireless terminal 104 can also store an RSSI value associated with that AP in the RSSI column 214 in association with the AP's MAC address. The wireless terminal 104 can determine the RSSI value based on a beacon frame received from that AP when the wireless terminal 104 designates the AP as a fringe-indicated AP. In this manner, the wireless terminal 104 can determine at some later time whether the link quality associated with that AP has improved since the time the AP was added to the AP fringe list 202. Such improvement in link quality may serve as a basis for removing the AP from the AP fringe list 202 based on a fringe-disassociation criterion stored in the AP fringe-disassociation criteria data structure 206.

To determine when an AP should be designated as a fringe-indicated AP, the wireless terminal 104 can use criteria or rules stored in the AP fringe criteria data structure 204. The wireless terminal 104 can use each criterion or rule alone or in combination with other criteria or rules to analyze non-responsiveness characteristics associated with APs (e.g., a quantity of failed data frame exchanges including power-save change signaling or a rate at which a quantity of such data frame exchanges have failed or have not successfully completed). For example, a first criterion may indicate that an AP should be designated as a fringe-indicated AP when a particular quantity of failed frame exchanges have been transmitted to that AP, while a second criterion may indicate that an AP should be designated as a fringe-indicated AP upon detection of a particular frequency or rate of failed frame exchanges with power-save change signaling. In some example implementations, the wireless terminal 104 may be configured to only use one of the first criterion or the second criterion when determining whether an AP should be designated as a fringe-indicated AP. In other example implementations, the wireless terminal 104 may be configured to use the first and second criteria in combination such that the wireless terminal 104 can designate an AP as a fringe-indicated AP based upon whichever one of the first or second criteria is met first.

To determine when an AP should be removed from the AP fringe list 202, the wireless terminal 104 can use criteria or rules stored in the AP fringe-disassociation criteria data structure 206. Each criterion or rule can be used alone or in combination with other criteria or rules. Example combination criteria may require that an RSSI value associated with a fringe-indicated AP must be equal to or greater than a particular threshold and also that the fringe-indicated AP can only be removed from the AP fringe list 202 during a scan performed at a lower association-attempt interval ($T_L$).

In some example implementations, the AP fringe-disassociation criteria data structure 206 may store a rule indicating that an AP can be removed from the AP fringe list 202 when the wireless terminal 104 is no longer within coverage of that AP. For example, referring to FIG. 1, once the AP 102a is designated as a fringe-indicated AP, the wireless terminal 104 would be able to disassociate the AP 102a from such fringe-indicated status after the wireless terminal 104 is moved outside the full wireless coverage area 108 and the fringe wireless coverage area 110 such that the wireless terminal 104 would no longer receive acceptable beacon signals from the AP 102a. Such a rule can be stored in the AP fringe-disassociation criteria data structure 206 in association with criteria indicating how the wireless terminal 104 should determine whether it is out of AP wireless coverage. An example of such a criterion may indicate that the wireless terminal 104 is out of wireless coverage of a particular AP after a particular quantity of beacon/probe scans (i.e., a scan count (S)) have occurred without receiving a communication from that AP. The predetermined value assigned to the scan count (S) can be selected based on how frequent (or the rate at which) beacon/probe scans are performed by the wireless terminal 104. That is, the scan count (S) value can be assigned a relatively high count value when beacon/probe scans are performed at a relatively high rate and can be assigned a relatively low count value when beacon/probe scans are performed at a relatively low rate. A wireless terminal that performs more frequent beacon/probe scans will perform a larger quantity of scans within a particular duration than another wireless terminal performing beacon/probe scans less frequently. Thus, assigning a higher count value to the scan count (S) when beacon/probe scans are performed more frequently and a lower count value to the scan count (S) when beacon/probe scans are performed less frequently facilitates enabling both wireless terminals to remove an AP from the AP fringe list 202 after substantially the same duration during which neither terminal received a beacon/probe frame from that AP.

Other rules or criteria stored in the AP fringe-disassociation criteria data structure 206 may include link quality-based criteria, power state-based criteria, AP-transition criteria, and/or time-based criteria. An example link quality-based rule or criterion indicates that an AP should be removed from the AP fringe list 202 when an RSSI value of that AP (e.g., as determined based on beacon frames and/or probe response frames from the AP) is better by some predetermined RSSI offset value than the RSSI value stored for that AP in the RSSI column 214 of the AP fringe list 202. Another example link quality-based rule or criterion indicates that an AP should be removed from the AP fringe list 202 when an RSSI value of that AP is equal to or greater than a predetermined RSSI threshold value. To implement such link quality-based rules, the AP fringe-disassociation criteria data structure 206 can store a rule (e.g., greater than or equal to) in connection with a criterion value (e.g., a RSSI offset criterion value or a RSSI threshold criterion value).

An example power state-based rule or criterion indicates that an AP should be removed from the AP fringe list 202 after a WLAN radio of the wireless terminal 104 is power cycled (i.e., turned off and then turned on again). An example AP-transition rule or criterion indicates that an AP should be removed from the AP fringe list 202 when the wireless terminal 104 is searching to transition to another AP and the only AP available for such transition is indicated in the AP fringe list 202. An example time-based rule or criterion indicates that an AP should be removed from the AP fringe list 202 after a predetermined amount of time has elapsed since the time at which the AP was added to the AP fringe list 202. In this manner, if the AP is not removed from the AP fringe list 202 earlier based on any of the above-described criteria or any other criteria, the AP will eventually be removed from the AP fringe list 202 based on the duration for which it is designated as a fringe-indicated AP. The wireless terminal 104 can use time-based rules or criteria based on timers or by comparing timestamps stored in the time added column 212 of the AP fringe list 202 with time values obtained from a real-time clock (RTC) (e.g., the RTC 334 of FIG. 3) of the wireless terminal 104.

The rules or criteria in the AP fringe criteria data structure 204 and the AP fringe-disassociation criteria data structure 206 can be changed from time to time by, for example, device manufacturers, wireless service providers, network operators, etc. In some instances, users may be allowed certain permissions to change the criteria.

Figure 3:
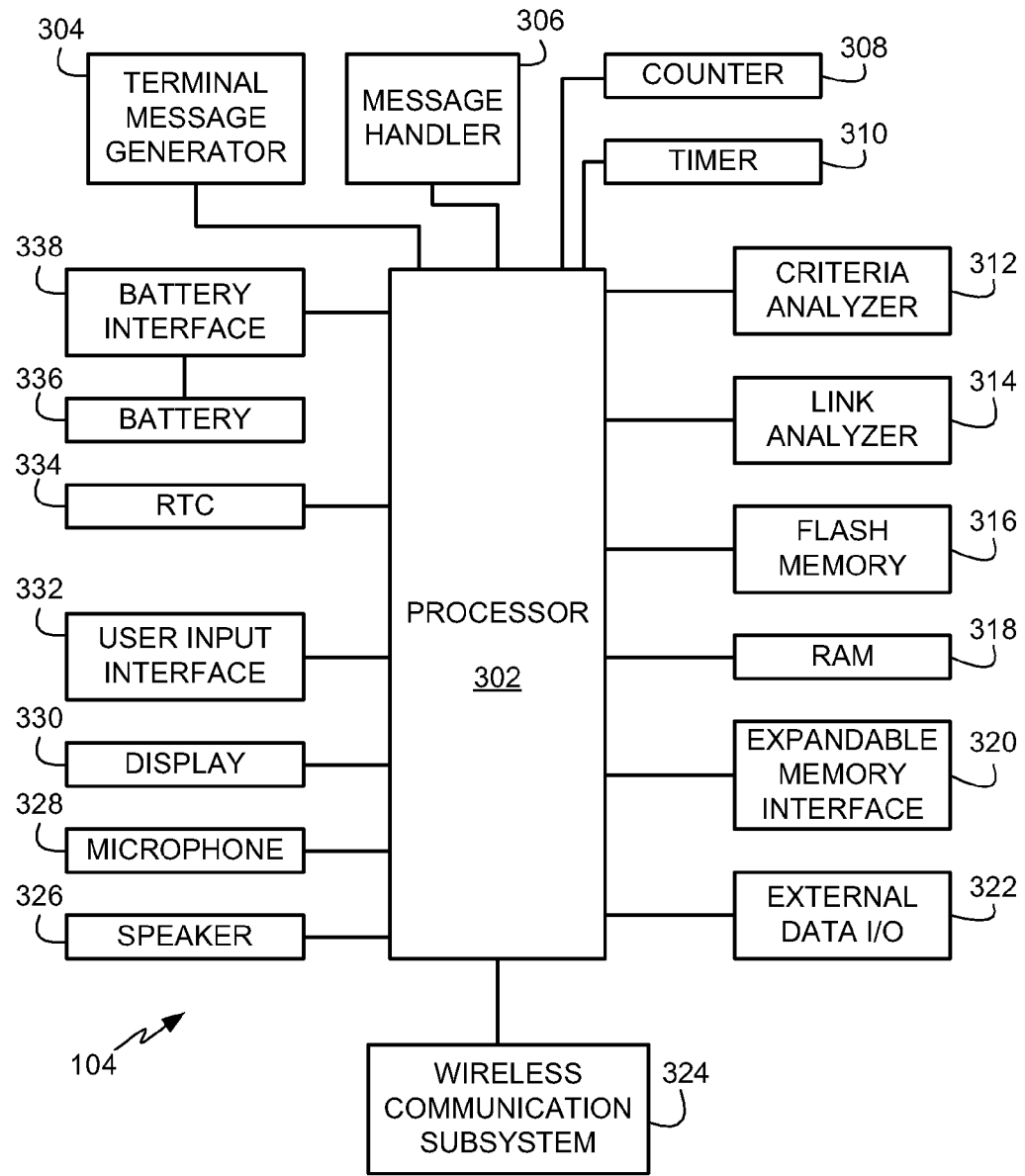
FIG. 3 depicts a block diagram of an example wireless terminal that can be used to implement the example methods and apparatus described herein.

Now turning to FIG. 3, an illustrated example of the wireless terminal 104 of FIGS. 1 and 2 is shown in block diagram form. In the illustrated example, the wireless terminal 104 includes a processor 302 that may be used to control the overall operation of the wireless terminal 104. The processor 302 may be implemented using a controller, a general purpose processor, a digital signal processor, dedicated hardware, or any combination thereof.

The wireless terminal 104 also includes a terminal message generator 304 that may be used to generate messages including the uplink data frames with power-save signaling to inform APs (e.g., the APs 102a-b of FIG. 1) that the wireless terminal 104 intends to transition into a power save mode. To receive and analyze messages received via wireless communications, the wireless terminal 104 is provided with a message handler 306. For example, the message handler 306 can determine when the wireless terminal 104 receives ACK frames or messages from APs or any other messages including beacon signals and RSSI messages.

To count quantities of failed data frame exchanges initiated by the wireless terminal 104 to inform associated APs that the wireless terminal 104 intends to enter a power save mode, the wireless terminal 104 is provided with a counter 308. Although a single counter 308 is shown, the counter 308 may be adaptable to support multiple counter instances to enable the wireless terminal 104 to track two or more separate quantities at the same time. To track lower associate-attempt rates ($T_L$) and higher associate-attempt rates ($T_H$), the wireless terminal 104 is provided with a timer 310. The wireless terminal 104 can also use the timer 310 in combination with the counter 308 to determine frequencies or rates of failed data frame exchanges. For instance, if a rule or criterion stored in the AP fringe criteria data structure 204 of FIG. 2 indicates that the wireless terminal 104 should designate an AP as a fringe-indicated AP if data frame exchanges initiated by the wireless terminal 104 have failed at a particular rate, the wireless terminal 104 can determine such rate by tracking the quantity of failed data frame exchanges using the counter 308 within a particular duration tracked using the timer 310. Although a single timer 310 is shown, the timer 310 may be adaptable to support multiple timer instances to enable the wireless terminal 104 to track two or more separate durations simultaneously.

To analyze criteria and/or rules associated with designating APs as fringe-indicated APs or disassociating APs from such fringe-indicated status, the wireless terminal 104 is provided with a criteria analyzer 312. The criteria analyzer 312 may retrieve criteria and/or rules from the AP fringe criteria data structure 204 and the AP fringe-disassociation criteria data structure 206 of FIG. 2 and determine based on the retrieved criteria/rules and information (e.g., non-responsiveness characteristics) collected/generated by the wireless terminal 104 whether APs should be designated as fringe-indicated APs or disassociated from such fringe-indicated status.

To analyze link quality of APs, the wireless terminal 104 is provided with a link analyzer 314. The wireless terminal 104 can use the link analyzer 314 to assess link strengths between the wireless terminal 104 and different APs. The wireless terminal 104 can use such analysis to, for example, determine whether to roam to other APs and/or determine whether to remove APs from the AP fringe list 202 (FIG. 2).

Although the terminal message generator 304, the message handler 306, the counter 408, the timer 310, the criteria analyzer 312, and the link analyzer 314 are shown as separate from and connected to the processor 302 in FIG. 3, in some example implementations, the terminal message generator 304, the message handler 306, the counter 408, the timer 310, the criteria analyzer 312, and the link analyzer 314 may be implemented in the processor 302 and/or in a wireless communication subsystem (e.g., a wireless communication subsystem 324). The terminal message generator 304, the message handler 306, the counter 408, the timer 310, the criteria analyzer 312, and the link analyzer 314 may be implemented using any desired combination of hardware, firmware, and/or software. For example, one or more integrated circuits, discrete semiconductor components, and/or passive electronic components may be used. Thus, for example, the terminal message generator 304, the message handler 306, the counter 408, the timer 310, the criteria analyzer 312, and the link analyzer 314, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The terminal message generator 304, the message handler 306, the counter 408, the timer 310, the criteria analyzer 312, and the link analyzer 314, or parts thereof, may be implemented using instructions, code, and/or other software and/or firmware, etc. stored on a tangible machine accessible medium and executable by, for example, a processor (e.g., the example processor 302). When any of the appended apparatus claims are read to cover a purely software implementation, at least one of the terminal message generator 304, the message handler 306, the counter 408, the timer 310, criteria analyzer 312, and the link analyzer 314 is hereby expressly defined to include a tangible medium such as a solid state memory, a magnetic memory, a DVD, a CD, etc.

The example wireless terminal 104 shown in FIG. 3 also includes a FLASH memory 316, a random access memory (RAM) 318, and an expandable memory interface 320 communicatively coupled to the processor 302. The FLASH memory 316 can be used to, for example, store computer readable instructions and/or data. In some example implementations, the FLASH memory 316 can be used to store one or more of the data structures discussed above in connection with FIG. 2. The RAM 318 can also be used to, for example, store data and/or instructions. The wireless terminal 104 is also provided with an external data I/O interface 322. The external data I/O interface 322 may be used by a user to transfer information to and from the wireless terminal 104 through a wired medium.

The wireless terminal 104 is provided with a wireless communication subsystem 324 to enable wireless communications with WLAN APs (e.g., the APs 102a-b). Although not shown, the wireless terminal 104 may also have a long-range communication subsystem to receive messages from, and send messages to, a cellular wireless network. In the illustrated examples described herein, the wireless communication subsystem 324 can be configured in accordance with the IEEE® 802.11 standard. In other example implementations, the wireless communication subsystem 324 can be implemented using a BLUETOOTH® radio, a ZIGBEE® device, a wireless USB device, or an ultra-wideband (UWB) radio (e.g., WiMax).

To enable a user to use and interact with or via the wireless terminal 104, the wireless terminal 104 is provided with a speaker 326, a microphone 328, a display 330, and a user input interface 332. The display 330 can be an LCD display, an e-paper display, etc. The user input interface 332 could be an alphanumeric keyboard and/or telephone-type keypad, a multi-direction actuator or roller wheel with dynamic button pressing capability, a touch panel, etc. As discussed above, the example methods and apparatus described herein can also be advantageously used in connection with wireless terminals that do not have user interfaces and, thus, the speaker 326, the microphone 328, the display 330, the user input interface 332, and/or any combination thereof may be optionally omitted.

The wireless terminal 104 is also provided with a real-time clock (RTC) 334 to track dates and a current time of day and/or to implement time-based and/or date-based operations. In the illustrated example, the wireless terminal 104 is a battery-powered device and is, thus, provided with a battery 336 and a battery interface 338.

FIGS. 4, 5A, 5B, and 6 depict example flow diagrams representative of example processes that may be implemented using computer readable instructions that may be used to manage power consumption of wireless terminals (e.g., the wireless terminal 104 of FIGS. 1 and 2) by selectively designating APs (e.g., the APs 102a-b of FIG. 1) as fringe-indicated APs when associated with fringe wireless coverage. The example operations of FIGS. 4, 5A, 5B, and 6 may be performed using a processor, a controller and/or any other suitable processing device. For example, the example operations of FIGS. 4, 5A, 5B, and 6 may be implemented using coded instructions stored on a tangible medium such as a flash memory, a read-only memory (ROM) and/or random-access memory (RAM) associated with a processor (e.g., the processor 302 of FIG. 3). Alternatively, some or all of the example operations of FIGS. 4, 5A, 5B, and 6 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIGS. 4, 5A, 5B, and 6 may be implemented manually or as any combination(s) of any of the foregoing techniques, for example, any combination of firmware, software, discrete logic and/or hardware. Further, although the example operations of FIGS. 4, 5A, 5B, and 6 are described with reference to the flow diagrams of FIGS. 4, 5A, 5B, and 6, other methods of implementing the operations of FIGS. 4, 5A, 5B, and 6 may be employed. For example, the order of execution of the blocks may be changed, and/or some of the blocks described may be changed, eliminated, subdivided, or combined. Additionally, any or all of the example operations of FIGS. 4, 5A, 5B, and 6 may be performed sequentially and/or in parallel by, for example, separate processing threads, processors, devices, discrete logic, circuits, etc.

Figure 4:
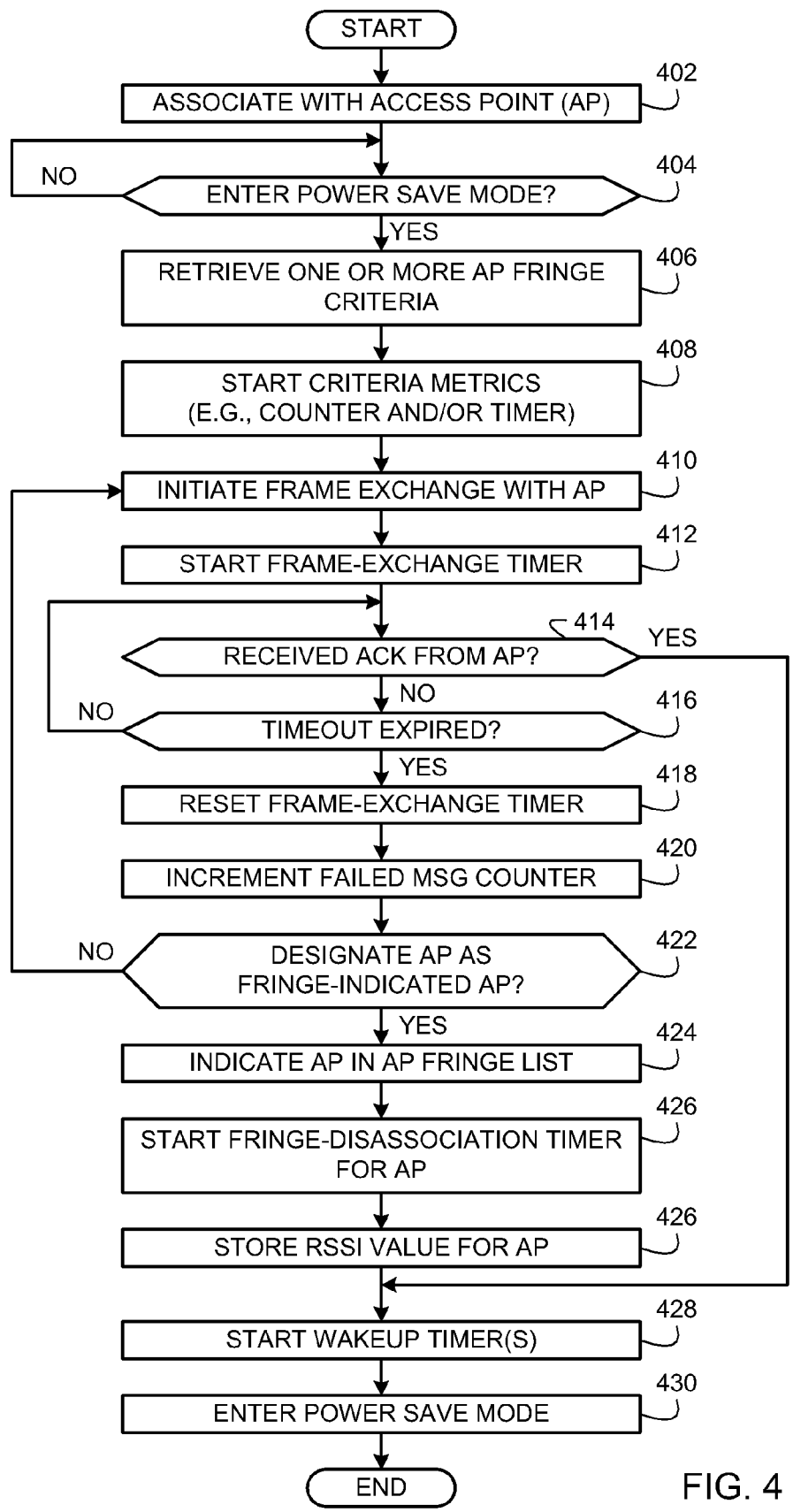
FIG. 4 depicts a flow diagram representative of an example process that may be implemented using computer readable instructions to manage power consumption of wireless terminals by associating access points with an access point fringe list.

Turning in detail to FIG. 4, the depicted example process can be used to transition the wireless terminal 104 into a power save mode while selectively placing an associated AP into the AP fringe list 202 of FIG. 2. As shown, initially, the wireless terminal 104 associates with (or connects with) an AP (e.g., the AP 102a of FIG. 1) (block 402). After some time, the wireless terminal 104 determines whether to enter a power save mode (block 404). If the wireless terminal 104 determines that it should not enter a power save mode (e.g., due to ongoing wireless activity), the wireless terminal 104 can continue operating in a normal mode and again at some later time determine whether to subsequently enter the power save mode. In any case, when the wireless terminal 104 determines that it should enter a power save mode (block 404), the criteria analyzer 312 (FIG. 3) retrieves one or more AP fringe criteria (block 406) from, for example, the AP fringe criteria data structure 204 of FIG. 2. The wireless terminal 104 then starts one or more criteria metrics (block 408). Criteria metrics include elements to facilitate collecting and/or generating non-responsiveness characteristics (e.g., quantity or rate of failed data frame exchanges associated with APs) used to determine whether AP fringe criteria is satisfied such that APs should be designated as fringe-indicated APs. In the illustrated examples described herein, example criteria metrics include the counter 308 and the timer 310 described above in connection with FIG. 3. Thus, if the AP fringe criteria retrieved at block 406 involve generating count values (e.g., failed frame exchange counts), the wireless terminal 104 can initialize one or more instantiations of the counter 308 at block 408. If the AP fringe criteria additionally or alternatively require tracking durations or intervals (e.g., for use in determining rates at which frame exchanges fail), the wireless terminal 104 can initialize one or more instantiations of the timer 310 at block 408.

The wireless terminal 104 then initiates a data frame exchange with the AP 102a (block 410) indicating that it intends to transition into a power save state. In the illustrated example, the wireless terminal 104 can initiate the data frame exchange by communicating a NULL data frame generated by the terminal message generator 304 in which a power save bit is set to one ('1'). The NULL data frame having the power save bit set to one can also be referred to as a power save message that is communicated by the wireless terminal 104 to initiate the data frame exchange. The wireless terminal 104 then starts a frame-exchange timer (block 412). The frame exchange timer may be implemented using an instance of the timer 310 to determine the amount of time to wait for an ACK frame from the AP 102a before declaring a failed frame exchange.

The message handler 306 (FIG. 3) determines whether an ACK message has been received from the AP 102a (block 414). In the illustrated example, the link analyzer 314 (FIG. 3) may be used to determine average and/or instantaneous measured RSSI values to differentiate between (i) low-quality channel conditions that might prevent the wireless device 104 from receiving ACK messages from an AP and (ii) collisions from other wireless terminals. A relatively low RSSI value indicates that a low-quality channel condition is attributing to non-receipt of an ACK message from the AP 102a, while a relatively high RSSI value indicates that an ACK message has not been received due to a collision with another wireless terminal. If a collision with another wireless terminal has occurred, the wireless terminal 104 may subsequently receive an ACK message from the AP 102a.

Upon the message handler 306 (FIG. 3) determining that an ACK message has not yet been received from the AP 102a (block 414), the processor 302 determines whether the frame-exchange timer has expired (block 416). If the acknowledge timer has not expired (block 416), the wireless terminal 104 continues to wait for the ACK message and control returns to block 414. When the frame-exchange timer has expired (block 416), the wireless terminal 104 resets the frame-exchange timer (block 418) and increments a failed message counter (block 420). The failed message counter can be implemented using an instance of the counter 308 to track the quantity of failed data frame exchanges. The criteria analyzer 312 (FIG. 3) then determines whether to designate the AP 102a as a fringe-indicated AP (block 422). For example, the criteria analyzer 312 can determine whether to designate the AP 102a as a fringe-indicated AP based on the one or more criteria retrieved at block 406 and metric information collected by the wireless terminal 104 in connection with sending data frames indicating a power-save state change to the AP 102a. For example, if an AP fringe criterion in the AP fringe criteria data structure 204 requires designating an AP as a fringe-indicated AP after the occurrence of a particular quantity of failed data frame exchanges, the criteria analyzer 312 can determine that the AP 102a should be designated as a fringe-indicated AP if the failed message count incremented at block 420 is equal to or greater than a failed message count criterion retrieved at block 406. Alternatively, if an AP fringe criterion requires designating an AP as a fringe-indicated AP in response to detecting a particular data frame exchange failure rate, the criteria analyzer 312 can determine the frame exchange failure rate based on the failed message count incremented at block 420 and a timer started at block 408. In such a case, if the failure of two consecutive data frame exchanges result in a failure rate equal to or greater than a frame exchange failure rate criterion retrieved at block 406, the criteria analyzer 312 can determine that the AP 102a should be designated as a fringe-indicated AP.

If at block 422, the criteria analyzer 312 determines that the AP 102a should not yet be designated as a fringe-indicated AP, control returns to block 410, at which point the wireless terminal 104 transmits another power save message to the AP 102a. However, if at block 422, the criteria analyzer 312 determines that the AP 102a should be designated as a fringe-indicated AP, the processor 302 indicates the AP 102a in the AP fringe list 202 (block 424) by, for example, storing the MAC address of the AP 102a in the AP MAC column 210 of the AP fringe list 202 (FIG. 2). At block 424, the processor 302 also stores a timestamp in the time added column 212 of the AP fringe list 202 in association with the MAC address of the AP 102a to indicate the time/date at which the AP 102a was designated as a fringe-indicated AP. In some example implementations, the processor 302 can display a message to a user via the display 330 (FIG. 3) informing the user that the wireless terminal 104 is being disconnected from it associated AP and that re-connection will be attempted at some later time.

In some example implementations, as in the illustrated example of FIG. 4, the processor 302 may start a fringe-disassociation timer (block 426) using, for example, an instance of the timer 310 of FIG. 3 upon designating the AP 102a as a fringe-indicated AP. The fringe-disassociation timer can be used to indicate when the AP 102a can be disassociated from a fringe-indicated status by, for example, removing the MAC address of the AP 102a from the AP fringe list 202. The fringe-disassociation timer may be set to count-down from a fringe-indicated duration criterion value stored in the AP fringe-disassociation criteria data structure 206 (FIG. 2) indicating the duration after which the AP 102a can be removed from the AP fringe list 202. Alternatively, the processor 302 can disassociate the AP 102a from a fringe-indicated status by comparing a time value of the real-time clock (RTC) 334 of the wireless terminal 104 to the timestamp stored at block 424 and determine whether the time difference is equal to or greater than the fringe-indicated duration criterion.

In some example implementations, as in the illustrated example of FIG. 4, the processor 302 may determine and store an RSSI value for the AP 102a in the RSSI column 214 of the AP fringe list 202 (block 426). In the illustrated example, the RSSI value is indicative of the link quality associated with the AP 102a at the time the processor 302 adds the AP 102a to the AP fringe list 202. The wireless terminal 104 can subsequently use the stored RSSI value in connection with RSSI values subsequently determined for the AP 102a to determine whether the AP 102a should be removed from the AP fringe list 202 based on a predetermined link quality offset criterion value stored in the AP fringe-disassociation criteria data structure 206.

After the processor 302 starts the fringe-removal timer for the AP 102a (block 426) or if the wireless terminal 104 receives an ACK message from the AP 102a (block 414), the processor 302 initializes and starts one or more wake-up timers (block 428) and transitions the wireless terminal 104 to a power save mode (block 430). The example process of FIG. 4 then ends. In the illustrated example of FIG. 4, the wake-up timers of block 428 include a low-rate association-attempt wake-up timer and a high-rate association-attempt wake-up timer. The wireless terminal 104 can use the low-rate wake-up timer to perform beacon/probe scans for fringe-indicated APs associated with the AP fringe list 202 and use the high-rate wake-up timer to perform beacon/scans for non-fringe-indicated APs. In this manner, the wireless terminal 104 can conserve battery charge by scanning less often for APs known to have been associated with poor link quality.

Figure 5A:
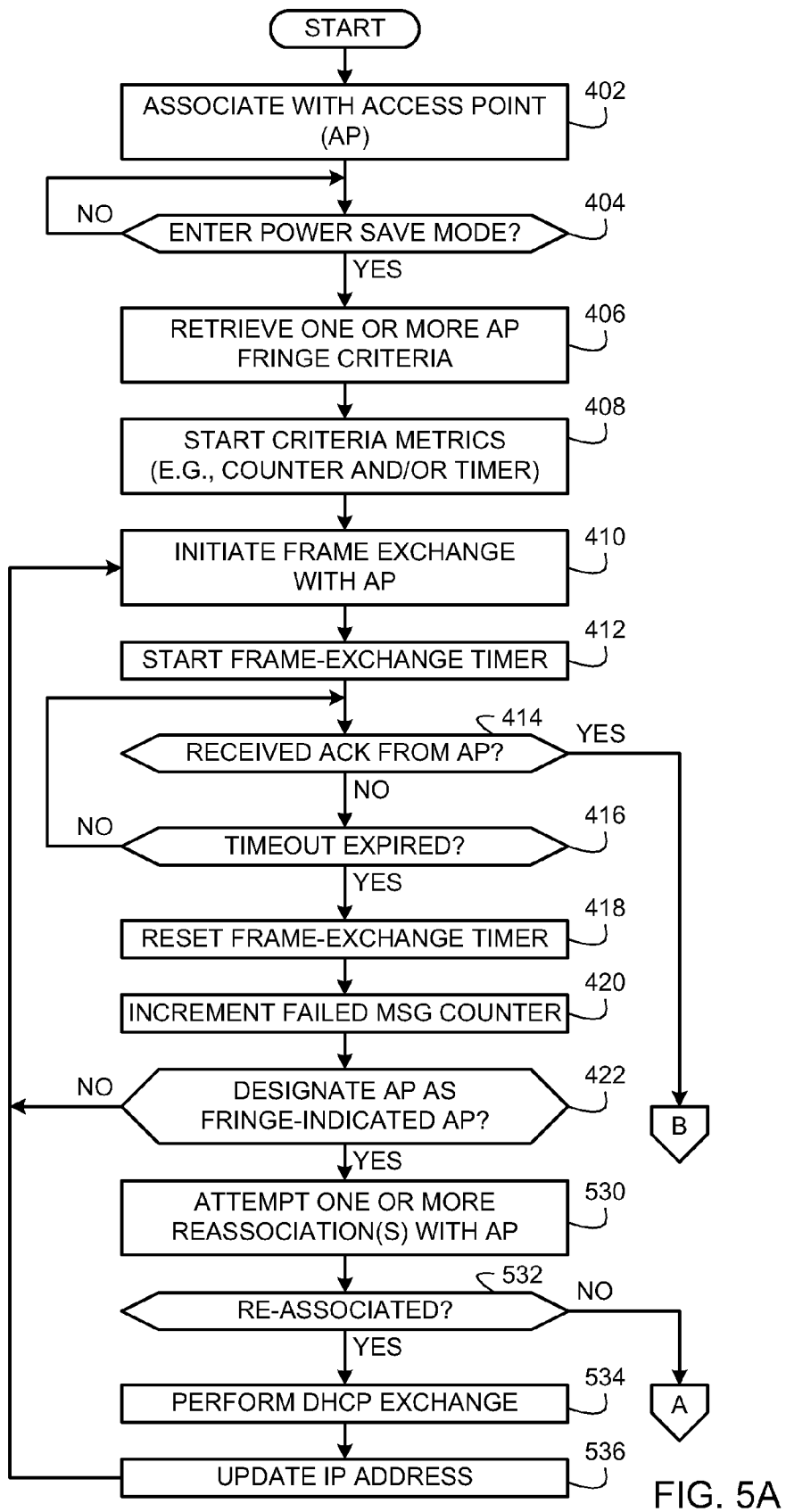
FIGS. 5A and 5B depict a flow diagram representative of another example process that may be implemented using computer readable instructions to manage power consumption of wireless terminals by associating access points with an access point fringe list.
Figure 5B:
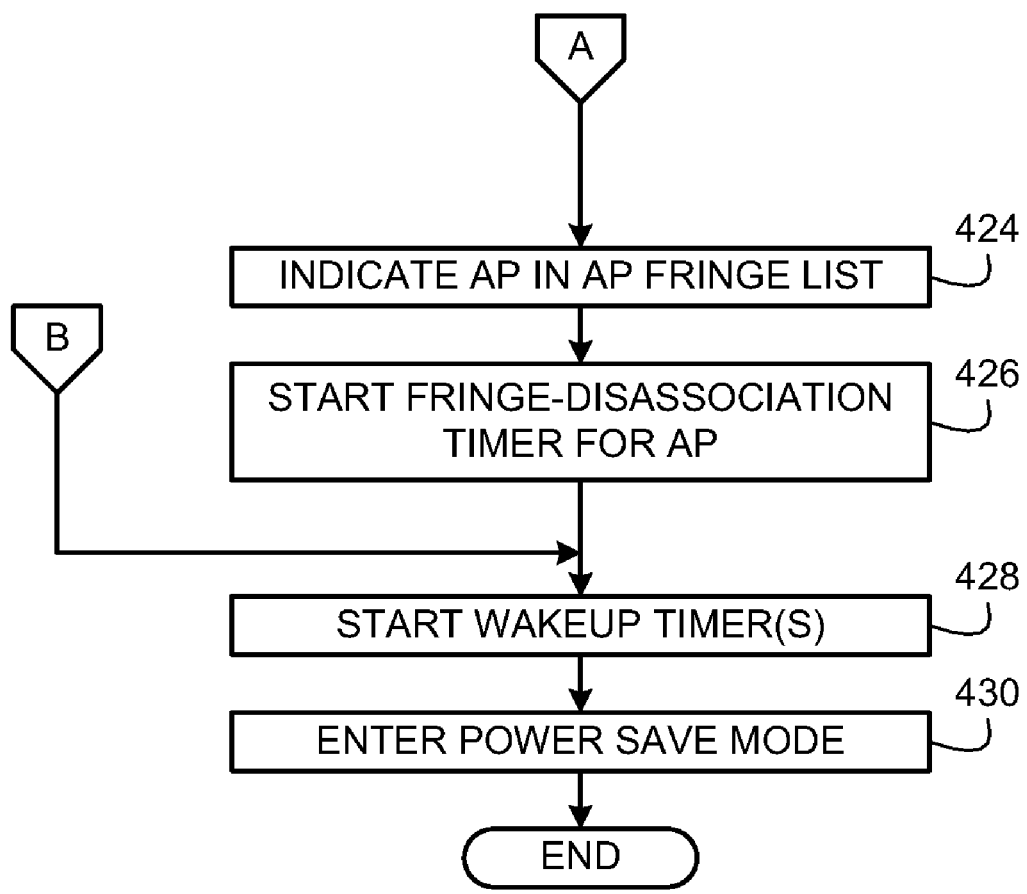

Turning now to FIGS. 5A and 5B, the depicted flow diagram is representative of another example process that the wireless terminal 104 can use to transition into a power save mode while selectively placing an associated AP into the AP fringe list 202 of FIG. 2. In the example process of FIGS. 5A and 5B, prior to designating an AP (e.g., the AP 102a of FIG. 1) as a fringe-indicated AP, the wireless terminal 104 is configured to attempt a re-association with that AP to determine whether the reason for not receiving an ACK message from the AP is due to the wireless terminal 104 being located in a fringe wireless coverage area (e.g., the fringe wireless coverage area 110 of FIG. 1) or due to the wireless terminal 104 no longer being associated with that AP. This process is described in greater detail below. In FIGS. 4 and 5A like reference numerals are used to show similar operations and, thus, those similar operations already described above in connection with FIG. 4 and appearing again in FIG. 5A are not described again below in connection with FIG. 5A. Instead, the interested reader is referred to the above descriptions for such operations. As such, continuing on with the flow diagram of FIGS. 5A and 5B, after the criteria analyzer 312 (FIG. 3) determines that it should designate the AP 102a as a fringe-indicated AP (block 422), the processor 302 (FIG. 3) attempts one or more re-associations with the AP 102a (block 530) (FIG. 5A). The quantity of re-associations that should be attempted can be selected based on a re-association retry quantity criterion value stored in the AP fringe criteria data structure 204 (FIG. 2) and retrieved by the criteria analyzer 312 at, for example, block 406. In this illustrated example, a re-association refers to a state of a wireless terminal in which an Open System Interconnection (OSI) layer 3 network stack configuration is maintained (i.e., the wireless terminal maintains a pairwise master key security association (PMKSA), IP network configuration, and associated transmission control protocol (TCP)/IP or user datagram protocol (UDP)/IP connections).

After attempting the one or more re-associations at block 530, the processor 302 determines whether the wireless terminal 104 is re-associated with the AP 102a (block 532). If the wireless terminal 104 is re-associated, the processor 302 performs a Dynamic Host Configuration Protocol (DHCP) exchange with the AP 102a (block 534) to, for example, ensure that the wireless terminal 104 has a valid internet protocol (IP) address. The processor 302 then updates the IP address of the wireless terminal 104 (block 536) based on the DHCP exchange and control returns to block 410, at which point the wireless terminal 104 can again attempt to enter a power save mode while it is associated with the AP 102a by determining whether it will successfully complete a frame exchange with the AP 102a that signals a state change to a power save mode.

As shown in FIG. 5A, if at block 532 the processor 302 determines that the wireless terminal 104 is not re-associated with the AP 102a, control advances to block 424 shown in FIG. 5B. As also shown in FIG. 5A, if at block 414 the message handler 306 (FIG. 3) determines that an ACK message has not yet been received from the AP 102a, control advances to block 424 shown in FIG. 5B. The descriptions of blocks 424, 426, 428, and 430 are not repeated here, but instead the interested reader is referred to such descriptions as set forth above in connection with the description of FIG. 4. After the wireless terminal 104 transitions into a power save mode (block 430), the example process of FIGS. 5A and 5B ends.

Figure 6:
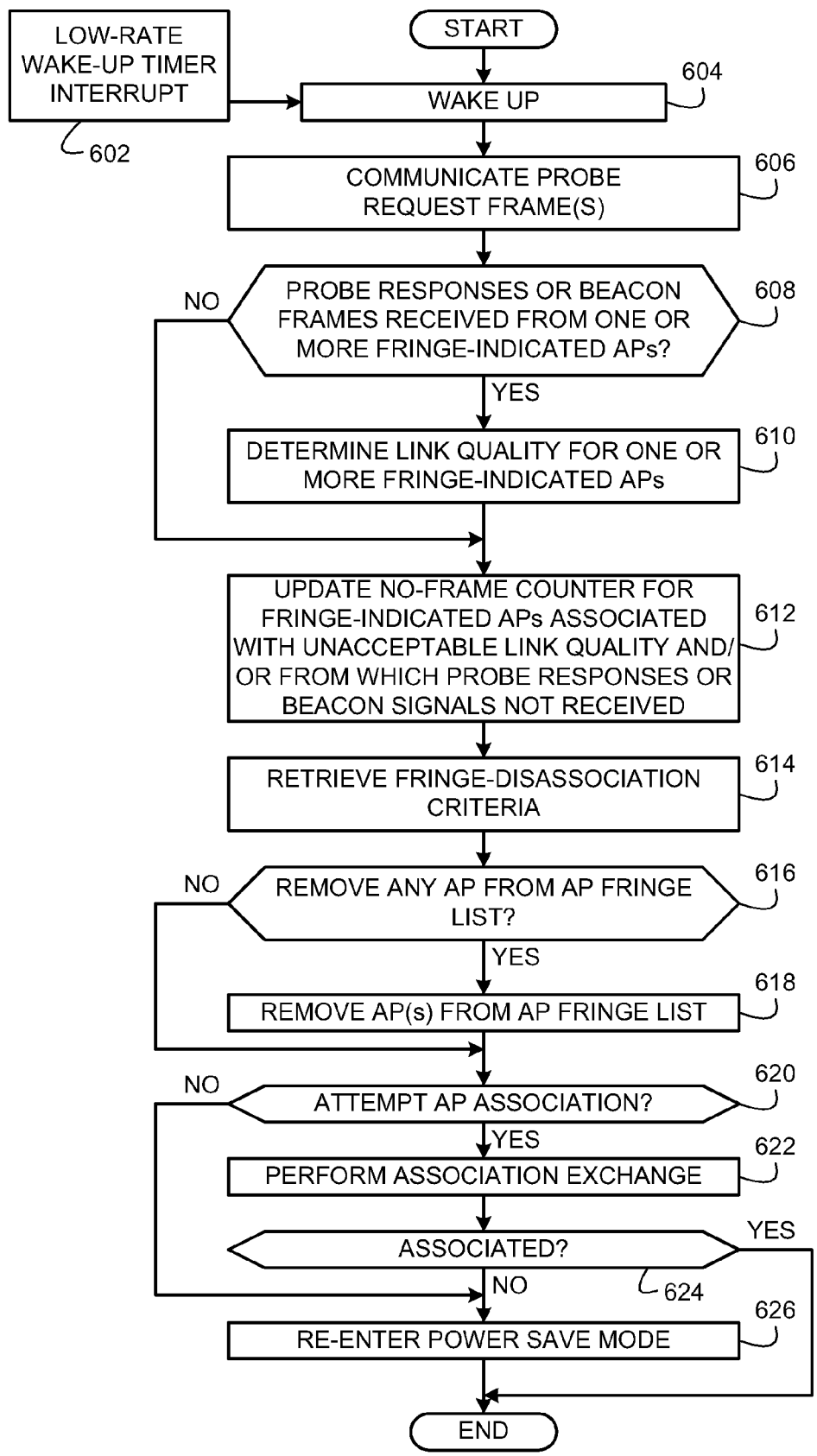
FIG. 6 depicts a flow diagram representative of an example process that may be implemented using computer readable instructions to remove access points from association with an access point fringe list.

Turning now to FIG. 6, the depicted example process can be used by the wireless terminal 104 to determine whether APs should be disassociated from a fringe-indicated status (e.g., removed from association with the AP fringe list 202 of FIG. 2). Initially, the wireless terminal 104 wakes up (block 604) in response to a low-rate wake-up timer interrupt 602. In the illustrated example, the low-rate wake-up timer interrupt 602 may be generated by a low-rate wake-up timer started by the processor 302 (FIG. 3) at block 426 of FIG. 4 and FIG. 5B.

In the illustrated example of FIG. 6, the wireless terminal 104 communicates one or more probe request frames (block 606) to the AP 102a and any other APs indicated in the AP fringe list 202. In the illustrated example, the probe request frames are generated by the terminal message generator 304 (FIG. 3) to request probe response frames from corresponding APs for the purpose of analyzing link quality. In some example implementations, the wireless terminal 104 may be configured to refrain from communicating such probe request frames upon wake up and instead wait to receive beacon frames and/or probe response frames broadcasted by APs in its AP fringe list 202. For example, APs typically broadcast beacon frames every 100 ms and broadcast probe response frames in response to probe requests from other wireless terminals. Thus, the wireless terminal 104 may be configured to wake up and wait to receive one of the broadcasted beacon frames and/or probe response frames without communicating a probe request frame. Alternatively, to avoid keeping the wireless terminal 104 in a wake state for 100 ms while passively awaiting broadcasted beacon and/or probe response frames, the wireless terminal 104 can be configured to transmit the one or more probe request frames as indicated at block 606 to actively request a probe response from one or more APs. In this manner, there is a relatively higher degree of certainty that the wireless terminal 104 will remain in the wake state for a shorter duration than the 100 ms that may be required to passively await broadcasted beacon and/or probe response frames.

The processor 302 determines whether it has received any probe responses or whether it has received any beacon frames from any fringe-indicated APs (block 608). In the illustrated example, the wireless terminal 104 can determine link quality associated with any fringe-indicated AP based on either probe responses or beacon frames using the link analyzer 314. If the wireless terminal 104 did receive any probe response or beacon frame (block 608), the link analyzer 314 determines the link quality for each fringe-indicated AP associated with any such received probe response or beacon frame (block 610). For example, the link analyzer 314 can determine RSSI values to measure radio frequency (RF) power for different channels associated with different APs. Alternatively, instead of RSSI values, the link analyzer 314 can determine Received Channel Power Indicator (RCPI) values.

After the link analyzer 314 determines the link qualities at block 610 or if the wireless terminal 104 did not receive any probe response or beacon frames from fringe-indicated APs at block 608, the processor 302 updates a no-frame counter for fringe-indicated APs associated with unacceptable link quality and/or from which probe responses or beacon frames were not received (block 612). In the illustrated example, the no-frame counter can be implemented using an instance of the counter 308 (FIG. 3). The criteria analyzer 312 retrieves one or more rules or criteria from the AP fringe-disassociation criteria data structure 206 (FIG. 2) (block 614) and determines whether to remove any fringe-indicated AP from the AP fringe list 202 (block 616) based on the one or more rules and/or criteria. For example, as discussed above in connection with FIG. 2, a rule for removing an AP from the AP fringe list 202 may require that a particular quantity of beacon/probe scans (i.e., a scan count (S)) have occurred without having received a communication from that AP. Using such a rule, a value for the scan count (S) can be selected as discussed above in connection with FIG. 2 and each beacon/probe scan corresponds to one operation at blocks 606 and a corresponding operation at block 608 during a wake-up session in response to the low-rate wake-up timer interrupt 602. Another example rule can involve removing an AP from the AP fringe list 202 after a particular amount of time has elapsed from the time the AP was added to the AP fringe list 202. For example, a fringe-disassociation criterion can include a fringe-indicated duration criterion value specifying the duration for which an AP should remain in the AP fringe list 202 absent other criteria that may warrant its earlier removal from the AP fringe list 202. The criteria analyzer 312 can then use a current RTC time value in connection with a timestamp value stored (e.g., at block 424 of FIG. 4) in the time added column 212 of the AP fringe list 202 in association with the particular AP being analyzed to determine whether the duration for which the analyzed AP has been in the AP fringe list 202 is equal to or greater than the fringe-indicated duration criterion value. Alternatively, the criteria analyzer 312 can use a fringe-disassociation timer (e.g., the fringe-disassociation timer started at block 426 of FIG. 4) to determine whether the analyzed AP should be removed from the AP fringe list 202 based on whether the fringe-disassociation timer has expired.

If the criteria analyzer 312 determines that one or more fringe-indicated APs should be removed from the AP fringe list 202 (block 616), the processor 302 removes the one or more APs from association with the AP fringe list 202 (block 618) by, for example, removing the MAC addresses of those APs from the AP fringe list 202. After disassociating one or more APs from a fringe-indicated status (block 618) or if the criteria analyzer 312 determines that it should not remove any APs from the AP fringe list 202 (block 616), the processor 302 determines whether it should attempt to associate the wireless terminal 104 with an AP (block 620). For example, the processor 302 may determine that it should attempt to associate or re-associate the wireless terminal 104 with an AP if the link analyzer 314 determined at block 610 that the AP is associated with an acceptable (and/or strongest) link quality. If the processor 302 determines that it should attempt an AP association (block 620), the processor 302 causes the wireless terminal 104 to perform an association messaging exchange with the selected AP (block 622). If the association is not successful (block 624) or if the processor 302 determines at block 620 that it should not attempt an AP association (e.g., due to no AP being associated with an acceptable link quality), the processor 302 re-transitions the wireless terminal 104 into the power save mode (block 626). After the wireless terminal 104 re-enters the power save mode (block 626) or if the AP association is successful (block 624), the example process of FIG. 6 ends.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to manage power consumption in a wireless terminal, the method comprising:
   initiating a data frame exchange with an access point of a wireless network;
   in response to not successfully completing the frame exchange with the access point, designating the access point as providing the wireless terminal with fringe wireless signal coverage, and storing a first signal strength, associated with the access point, in a data structure at the wireless terminal; and
   ignoring a beacon signal, broadcast by the access point, when a second signal strength of the beacon signal is less than the first signal strength stored in the data structure.

2. A method as defined in claim 1, wherein the fringe wireless signal coverage allows the wireless terminal to successfully receive communications from the access point but does not allow the access point to successfully receive communications from the wireless terminal.

3. A method as defined in claim 1, wherein the data frame exchange is not successfully completed when the wireless terminal does not receive an acknowledge frame from the access point in response to the initiated data frame exchange.

4. A method as defined in claim 1, wherein initiating the data frame exchange comprises communicating information indicative of an intention of the wireless terminal to enter a power conservation mode.

5. A method as defined in claim 4, further comprising, after not successfully completing the frame exchange with the access point, transitioning the wireless terminal into the power conservation mode.

6. A method as defined in claim 1, further comprising, in response to not successfully completing the frame exchange with the access point:
   analyzing a non-responsiveness characteristic associated with the access point; and
   designating the access point as providing the wireless terminal with the fringe wireless signal coverage based on the non-responsiveness characteristic.

7. A method as defined in claim 6, wherein the non-responsiveness characteristic is a quantity of data frame exchanges initiated with the access point and not successfully completed.

8. A method as defined in claim 6, wherein the non-responsiveness characteristic is a rate at which a quantity of data frame exchanges initiated with the access point have not been successfully completed.

9. A method as defined in claim 1, further comprising, prior to designating the access point as providing the wireless terminal with the fringe wireless signal coverage, attempting a re-association with the access point.

10. A method as defined in claim 9, further comprising, when the re-association is successful, initiating a second data frame exchange with the access point and determining whether the second data frame exchange is successfully completed prior to designating the access point as providing the wireless terminal with the fringe wireless signal coverage.

11. A method as defined in claim 1, further comprising starting a timer in the wireless terminal, the timer associated with wake-up intervals during which the wireless terminal is to analyze at least one of a received beacon signal or a received probe response from at least one of the access point or any other access point designated as providing the wireless terminal with the fringe wireless signal coverage.

12. A method as defined in claim 1, wherein designating the access point as providing the wireless terminal with the fringe wireless signal coverage comprises indicating the access point in the data structure at the wireless terminal.

13. A method as defined in claim 12, wherein indicating the access point in the data structure comprises storing a media access control address of the access point in the data structure.

14. An apparatus to manage power consumption in a wireless terminal, the apparatus comprising:
 a processor configured to:
  initiate a data frame exchange with an access point of a wireless network;
  in response to not successfully completing the frame exchange with the access point, designate the access point as providing the wireless terminal with fringe wireless signal coverage, and store a first signal strength, associated with the access point, in a data structure at the wireless terminal; and
  ignore a beacon signal, broadcast by the access point, when a second signal strength of the beacon signal is less than the first signal strength stored in the data structure.

15. An apparatus as defined in claim 14, wherein the fringe wireless signal coverage allows the wireless terminal to successfully receive communications from the access point but does not allow the access point to successfully receive communications from the wireless terminal.

16. An apparatus as defined in claim 14, wherein the processor is further configured to:
 analyze a non-responsiveness characteristic associated with the access point in response to not successfully completing the frame exchange with the access point; and
 designate the access point as providing the wireless terminal with the fringe wireless signal coverage based on the non-responsiveness characteristic.

17. An apparatus as defined in claim 14, wherein the processor is further configured to attempt a re-association with the access point prior to designating the access point as providing the wireless terminal with the fringe wireless signal coverage.

18. A method to manage power consumption in a wireless terminal, the method comprising:
 designating an access point of a wireless network as providing the wireless terminal with fringe wireless signal coverage by storing a first channel power, associated with the access point, in a data structure at the wireless terminal;
 during a wake-up interval of the wireless terminal from a power conservation mode, determining whether a second channel power associated with a beacon signal broadcast by the access point is better than the first channel power stored in the data structure;
 initiating a re-association with the access point when the second channel power is better than the first channel power stored in the data structure; and
 ignoring the beacon signal, broadcast by the access point, when the second channel power is less than the first channel power stored in the data structure.

19. A method as defined in claim 18, wherein the fringe wireless signal coverage allows the wireless terminal to successfully receive communications from the access point but does not allow the access point to successfully receive communications from the wireless terminal.

20. A method as defined in claim 18, further comprising designating the access point of the wireless network as providing the wireless terminal with the fringe wireless signal coverage by storing a media access control address of the access point in the data structure at the wireless terminal.

* * * * *